United States Patent [19]
Cox

[11] Patent Number: 6,154,643
[45] Date of Patent: *Nov. 28, 2000

[54] BAND WITH PROVISIONING IN A TELECOMMUNICATIONS SYSTEM HAVING RADIO LINKS

[75] Inventor: Christopher Richard Cox, East Portlemouth, Germany

[73] Assignee: Nortel Networks Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/992,348

[22] Filed: Dec. 17, 1997

[51] Int. Cl.$^7$ .................................................. H04M 15/00
[52] U.S. Cl. ........................ 455/406; 455/408; 455/452; 455/453
[58] Field of Search .................................. 455/406, 408, 455/452, 453, 464

[56] References Cited

U.S. PATENT DOCUMENTS

| | | |
|---|---|---|
| 5,065,393 | 11/1991 | Sibbitt et al. . |
| 5,504,744 | 4/1996 | Adams et al. ........................ 370/60.1 |
| 5,608,446 | 3/1997 | Carr et al. ..................................... 348/6 |
| 5,629,938 | 5/1997 | Carciello et al. ....................... 370/384 |
| 5,666,649 | 9/1997 | Dent ......................................... 455/406 |
| 5,724,659 | 3/1998 | Daniel et al. ........................... 455/452 |
| 5,812,786 | 9/1998 | Seaholtz et al. ................... 395/200.63 |
| 5,828,737 | 10/1998 | Sawyer .................................... 455/408 |

*Primary Examiner*—Daniel S. Hunter
*Assistant Examiner*—Thuan T. Nguyen
*Attorney, Agent, or Firm*—Lee, Mann, Smith, McWilliams, Sweeney & Ohlson

[57] ABSTRACT

This invention relates to telecommunication bandwidth provisioning systems in radio telecommunications. Radio-link networks are inevitably constrained by limited availability of radio channels within the radio spectrum assigned to such use. The consequent need of and benefit from optimising management of assignment of radio channels is self-evident. Such need and benefit are emphasised where different usages by the same subscribers have different radio bandwidth requirements. For example, voice calls generally require less radio bandwidth than data transfers via computer modems, and are typically handled by 32 Kilobits per second (Kb/s) and 64 Kb/s radio channels, respectively. The present invention provides a system and method of operating at different bandwidths and of providing a billing system therefor.

19 Claims, 3 Drawing Sheets

BAND WITH PROVISIONING IN A TELECOMMUNICATIONS SYSTEM HAVING RADIO LINKS

TECHNICAL FIELD

This invention relates to bandwidth provisioning systems within a telecommunications system including radio links.

TECHNICAL BACKGROUND

Telecommunication systems are well-known in which connection networks include multi-channel radio links as well as non-radio typically hard-wired links which will generally be referred to as cable.

Radio link networks are inevitably constrained by limited availability of radio channels within the radio spectrum assigned to such use. There is therefore a need to optimise radio channel resources.

Many subscribers of radio link networks now have more than one bandwidth requirement. For example, voice calls generally require less radio bandwidth than data transfers via computer modems, typically 32 Kilobits per second (Kb/s) and 64 Kb/s radio channels respectively.

U.S. Pat. No. 5,065,393 describes provision for each subscriber to instruct periods of time in which different radio bandwidths are required for specified communication connections, including a connection controller which automatically pre-assigns an appropriate radio channel for required periods of time, and further provides cost accounting information related to such pre-assignments.

OBJECT OF THE INVENTION

It is a general object of this invention to facilitate efficient provisioning of bandwidth resources in a telecommunications system including radio links.

SUMMARY OF THE INVENTION

In accordance with a first aspect of the invention, there is provided a communication system providing for radio communication between a subscriber equipment and a communications interface by way of automatic controlling means, the radio communication provision including capability for communications at at least two channel bandwidths, the subscriber equipment having a first capability to operate at a first bandwidth and a second capability to operate at a second bandwidth, the system having means for reconfiguring from a first system configuration using only said first bandwidth for said subscriber equipment radio communication to a second system configuration further allowing use of said second bandwidth automatically according to said subscriber equipment requirements and predetermined system requirements.

The system can further provide means whereby the bandwidth change is denied at a particular time period and/or for a particular group of subscriber equipment, alternatively, the system can further provide means whereby the bandwidth change is allowed at a particular time period and/or for a particular group of subscriber equipment.

The system preferably further includes billing means responsive to said system reconfiguring whereby said billing means may operate according to a different tariff for usage of said second bandwidth.

In accordance with another aspect of the invention, there is provided a communications system serving a plurality of subscribers and comprising: an automatic controlling means including a database of subscriber information; a plurality of subscriber radio communications links capable of communicating over two or more bandwidths; an exchange facility; wherein each subscriber may be connected to said exchange facility by a subscriber radio communications link over one of said bandwidths; and wherein said automatic controlling means is capable of reconfiguring the system such that said subscriber connection is by said subscriber radio communications link over a second said bandwidth, said reconfiguration being dependent on subscriber bandwidth requirements, subscriber information, and system capability.

In accordance with a still further aspect of the invention, there is provided a telecommunications central office or exchange equipment for use in a communication system providing for radio communication between a subscriber equipment and a communications interface by way of automatic controlling means, the radio communication provision including capability for communications at at least two channel bandwidths, the subscriber equipment having a first capability to operate at a first bandwidth and a second capability to operate at a second bandwidth, the system having means for reconfiguring from a first system configuration using only said first bandwidth for said subscriber equipment radio communication to a second system configuration further allowing use of said second bandwidth automatically according to said subscriber equipment requirements and predetermined system requirements.

In accordance with a still further aspect of the invention there is provided a subscriber equipment terminal for use in a communication system providing for radio communication between a subscriber equipment and a communications interface by way of automatic controlling means, the radio communication provision including capability for communications at at least two channel bandwidths, the subscriber equipment having a first capability to operate at a first bandwidth and a second capability to operate at a second bandwidth, the system having means for reconfiguring from a first system configuration using only said first bandwidth for said subscriber equipment radio communication to a second system configuration further allowing use of said second bandwidth automatically according to said subscriber equipment requirements and predetermined system requirements.

In accordance with a still further aspect of the invention there is provided a method of operating a communications system serving a plurality of subscribers and comprising: automatic controlling means including a database of subscriber information; a plurality of subscriber radio communications links capable of communicating over two or more bandwidths; an exchange facility; wherein each said subscriber is connected to said exchange facility by one of said subscriber radio communications links over one of said bandwidths; the method comprising the steps of:

(a) the automatic controlling means receives a request to change the bandwidth of a subscriber radio communications link, (b) the controller determines the system configuration such that the request is denied if the system is incapable of being reconfigured to support the requested bandwidth change;

(c) the controller determines from the subscriber information whether the subscriber using said subscriber communications link is permitted the requested bandwidth change;

(d) if the system is reconfigurable as determined in step (b), and the subscriber is permitted to change as determined in step (c), then the system and the subscriber radio communication link are reconfigured to operate at the requested bandwidth.

The method preferably further comprises billing a subscriber at a rate dependent on the bandwidth used by the subscriber.

The bandwidth change can be requested by the subscriber of the subscriber radio communications link, another subscriber, the system, or an external communicator such as a caller connected to the system from the public switched telephone network for example. The bandwidth change may be dependent upon for example: the subscriber's status; the subscriber's priority rating; bandwidth access limitations.

Step (a) may further comprise a request for bandwidth change for a predetermined time period, and step (b) and (c) may further comprise the requirement of determining the system capacity and subscriber permission to change the bandwidth for said predetermined time.

DESCRIPTION OF THE DRAWINGS

In order that the present invention can be more fully understood and to show how the same may be carried into effect, reference shall now be made, by way of example only, to the figures as shown in the accompanying drawing sheets wherein.

DETAILED DESCRIPTION OF THE PREFERRED EMBODIMENTS

There will now be described by way of example the best mode contemplated by the inventors for carrying out the invention. In the following description, numerous specific details are set out in order to provide a complete understanding of the present invention. It will be apparent, however, to those skilled in the art that the present invention may be put into practice with variations of the specific.

Figure 1:
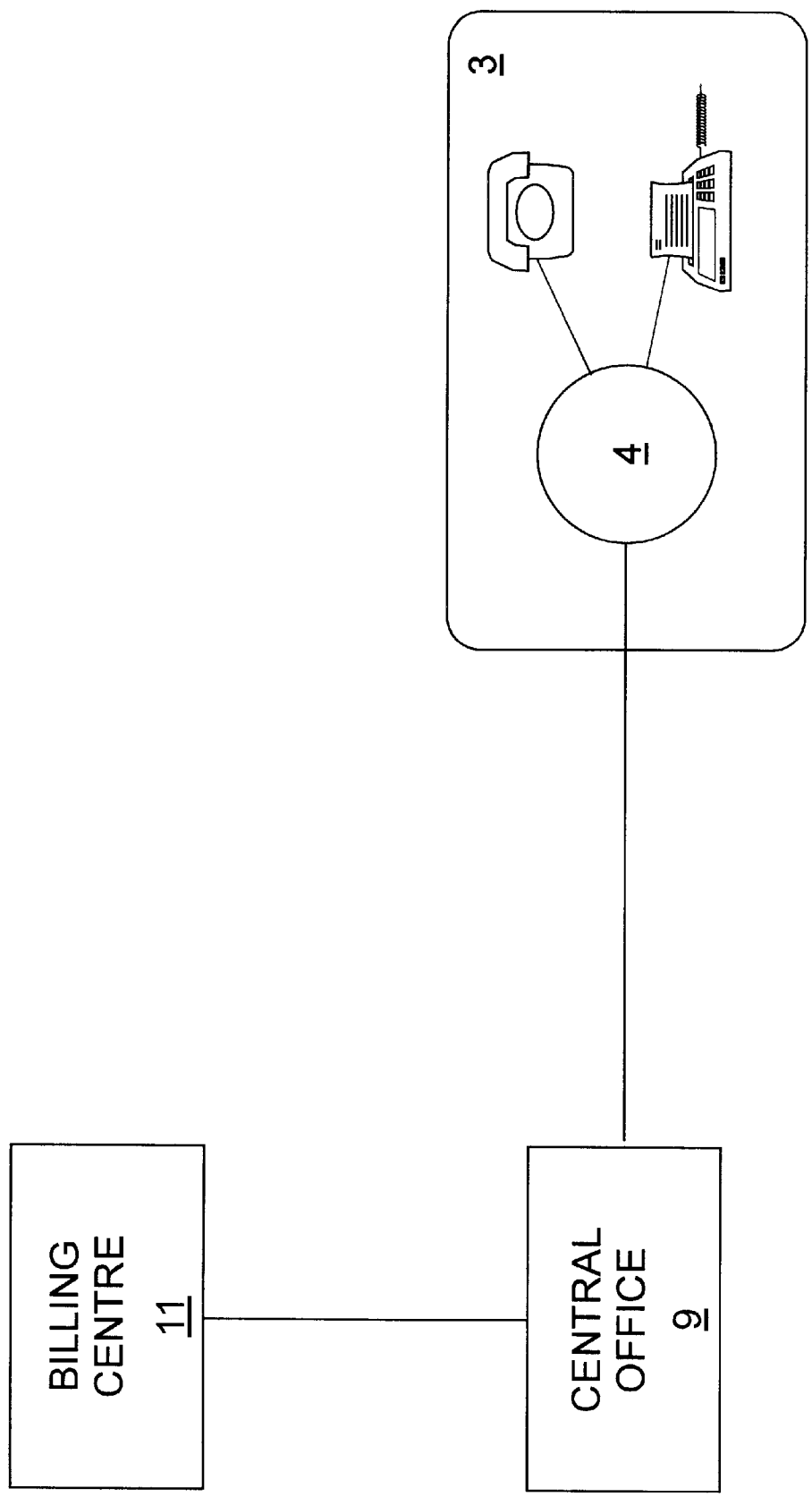
FIG. 1 is a prior art system block diagram for telephone communication using hard-wired cable connection facilities.

In FIG. 1, a telephone exchange or central office 9 is hard-wire connected to customer premises equipment 4 at a subscriber location 3, usually by way of multiple lines per subscriber. A billing system 11 is connected to the exchange 9, although it would, in practice be associated with the exchange. The exchange provides a gateway to the Public Service Telephone Network (PSTN).

Radio links can be used in a telephone network as a substitute for the cable that has traditionally been employed to make the "local loop connection" between the subscribers premises equipment 4 and the telephone exchange 9.

Figure 2:
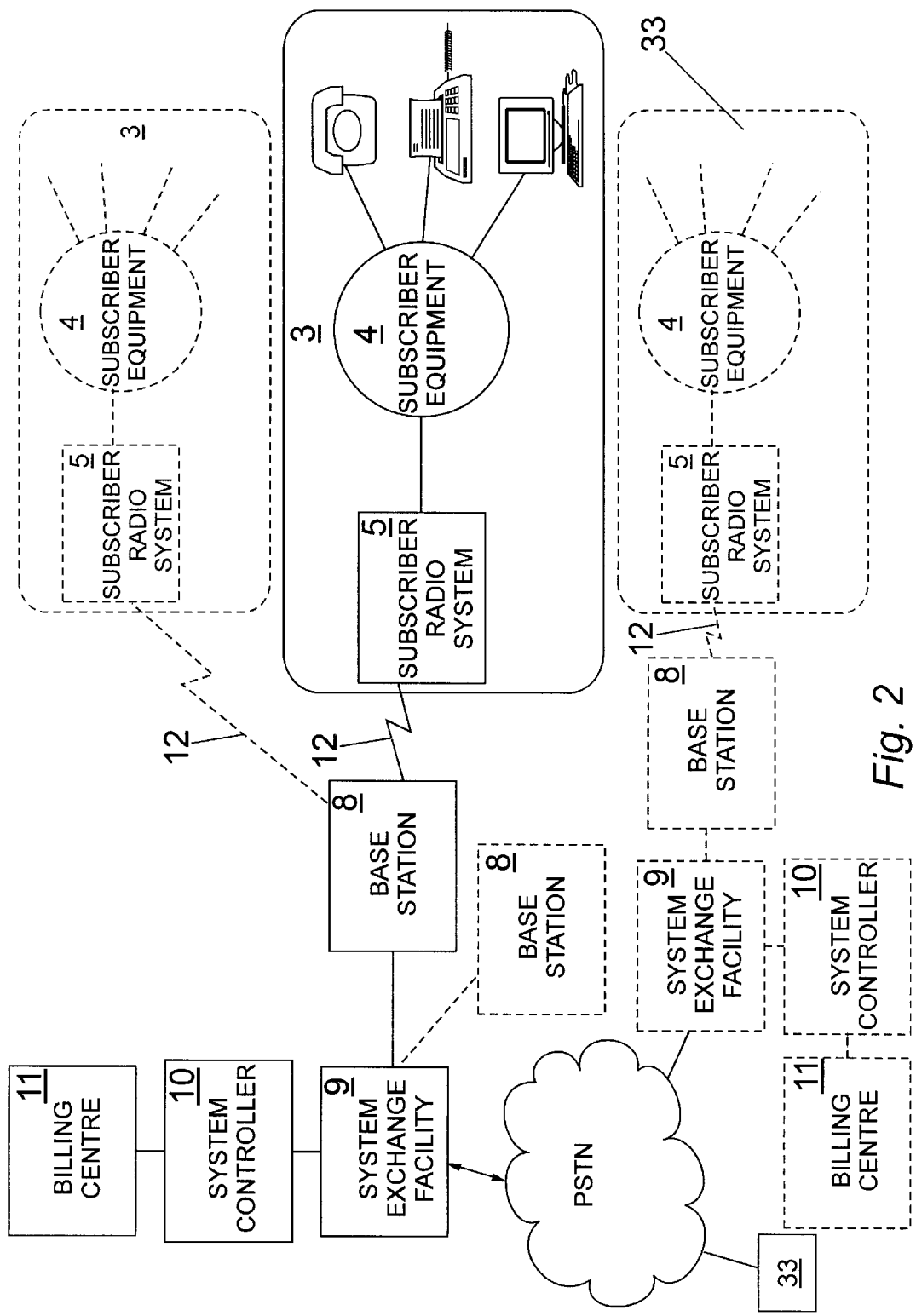
FIG. 2 is a system block diagram for telecommunications using the system of the present invention with radio link connection facilities and radio bandwidth provisioning.

FIG. 2 shows a preferred telecommunications system 1 of the invention which comprises: a plurality of subscribers 3 each with subscriber premises equipment 4 such as telephones, faxes and modems, together with a subscriber radio system 5; a base station 8; a system exchange facility 9; a system controller 10; and a billing centre 11.

The base station 8 and subscriber radio system 5 include transceiver arrangements and are configured to support radio communication links 12 between them at a number of bandwidths depending on the actual or potential subscriber premises equipment 4 they are designed to support.

The system exchange facility 9 is analogous to a central office and preferably includes interfaces to other telecommunications systems such as the public switched telephone network (PTSN) or a satellite network for example. It may also be connected directly to another base station 8 which forms part of the telecommunications system 1, as shown in dashed outline in FIG. 2.

An item of subscriber premises equipment 4 is connected to the exchange facility 9 via the radio link 12 between the base station 9 and the subscriber radio system 5. The exchange facility 9 completes the connection to either another subscriber 3 via a further radio link 12 from the base station 8, or to an external site 33 via for example the PSTN. The external site 33 may be connected by cable to the PSTN or by a further radio link through another system of the invention for example.

The bandwidth required for the connection is requested by the subscriber 3 or external site 33 initiating the call and may or may not be allocated as detailed below.

Various other configurations of the system are possible which would be obvious to those skilled in the art for example a radio link 12 may support more than one subscriber 3 off a single subscriber radio system 5 as shown in dashed outline in FIG. 2.

The system controller 10 receives requests for and allocates bandwidth for each connection or call to/from a subscriber 3 over a radio link 12 using control signals. The controller 10 is a computer based system including a database of subscriber information for each subscriber 3 including their type of subscription or status (eg premium or budget), bandwidth allowance (including any limitations eg to specified time periods), priority status. Generally all subscribers will be allocated at least a minimum bandwidth at all times, for example for telephone calls at 32 Kbit/s. It is conceivable however that some subscribers may be restricted to certain hours of such usage, or that extended bandwidth use is restricted to these hours.

The controller 10 allocates radio channels for both subscriber message traffic as well as system control signals, (for administration, operations and maintenance) between the controller 10 or base station 9 and the subscriber radio system 5. Such control signals include the enabling and use of channels in the radio link. Alternatively, control signals may be communicated using an existing hard wire link between the subscriber 3 and the exchange facility 9, if available.

The billing centre 11 is configured to record the duration of radio link 12 calls or connections together with the bandwidth used for the call. The billing centre 11 is preferably a computer based system with database logging facility. Call connection, duration and bandwidth are logged. This information is then used to automatically bill the subscriber 3 or external site 33 that initiated the call.

Figure 3:
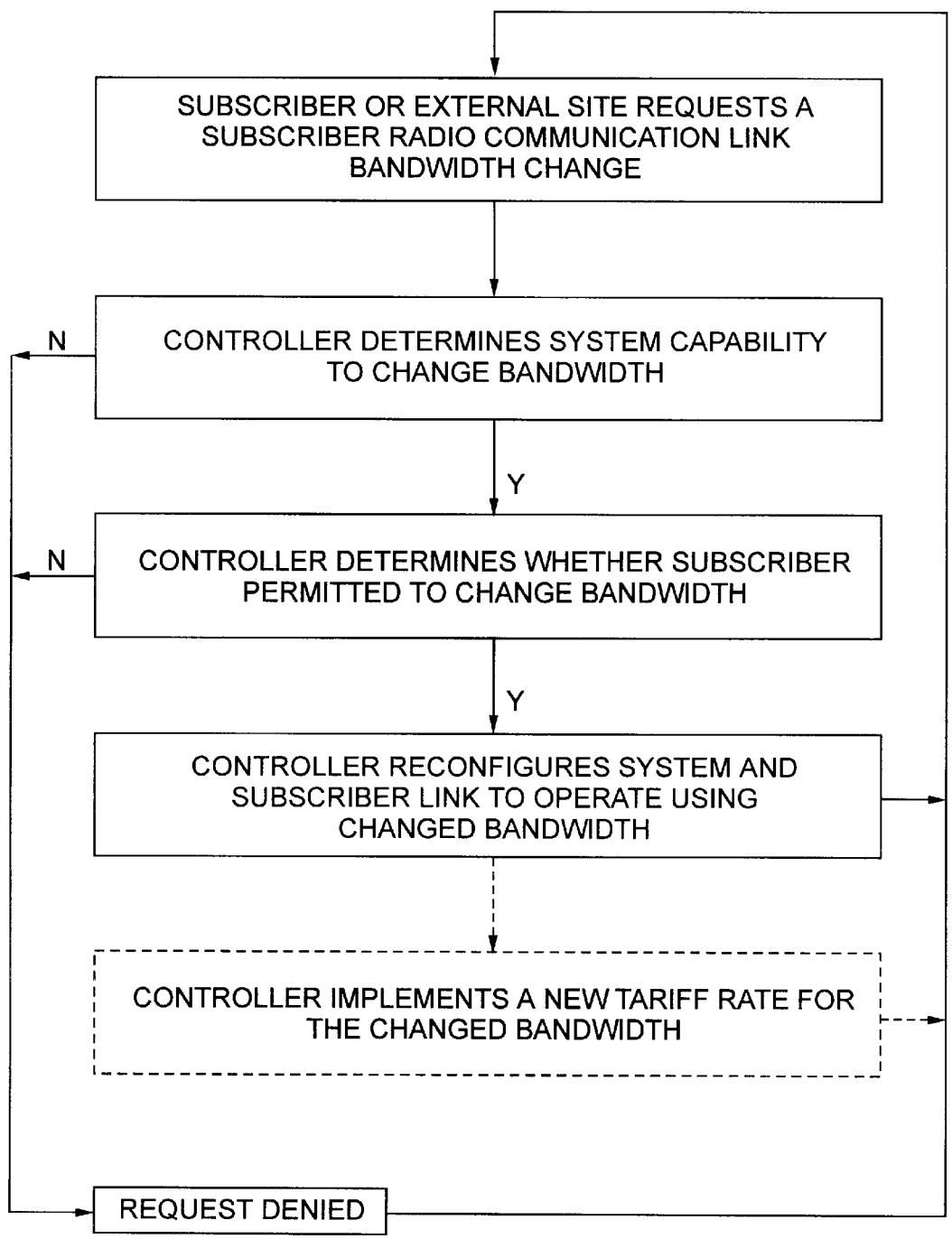
FIG. 3 is a flow diagram for operation of bandwidth extension for a telecommunications system using radio link connection facilities.

FIG. 3 shows the operation of the system. When a request is made by a subscriber 3 or an external site 33 for a call utilising a bandwidth greater than the minimum (for example a 64 Kbit/s modem connection), the controller 10 determines whether the configuration of the system 1 can be changed to meet this request. For example the controller 10 will determine whether the base station 8 has an available channel of the requested bandwidth. Alternatively the controller 10 may monitor the system's real time capacity or configuration in a database such that the availability of bandwidth can be managed and its use prioritised for example by only allowing high priority status subscribers to use some of the available bandwidth if the available bandwidth is less than a predetermined limit.

If the requested bandwidth is available, the controller 10 will determine whether the subscriber 3 is permitted to use this bandwidth. This will depend on the subscriber's subscription information including any bandwidth restrictions or duration limitations. Subscriber permission may also depend on the subscriber priority status as described above so that if a requesting subscriber has a low priority status and there is less than a predetermined level of bandwidth availability, then the request will be denied.

If the subscriber 3 has the necessary permission and the system 1 can be reconfigured to support the call or connection, then the controller 10 sends appropriate control signals to the base station 8 and the subscriber radio system 5 to enable the changed bandwidth connection between them.

If the requested bandwidth is implemented, the billing centre 11 may be configured to utilise a different tariff for the operation of the changed bandwidth connection, and bill the initiator of the connection.

The system controller 10 may also be configured to facilitate requests for changed bandwidth for a predetermined duration. Upon receiving such a request the controller 10 determines whether the requested bandwidth is available for the specified duration dependent on other system commitments including higher priority subscriber requests for conflicting durations of increased bandwidth.

The system may also be configured to allocate bandwidth to predetermined users at predetermined times and to take account of this when allocating bandwidth to others upon request.

The system may include a combination of radio and fixed cable links to one or more of the subscribers.

The system may also include provision for global changes to the bandwidth of all or some subscriber radio communication links or provision for this, e.g. some subscribers may be restricted to limited bandwidth provision upon occurrence of certain events such as a particular high priority subscriber requiring a large amount of bandwidth.

What is claimed is:

1. A communications system providing for radio communication between a subscriber equipment and a communications interface by way of automatic controlling means, the radio communication provision including capability for communications at least two channel bandwidths, the subscriber equipment having a first capability to operate at a first bandwidth and a second capability to operate at a second bandwidth, the system having means for reconfiguring from a first system configuration using only said first bandwidth for said subscriber equipment radio communication to a second system configuration further allowing use of a second bandwidth for said communication, wherein said second system configuration is implemented by said controlling means upon request for operation at said second bandwidth dependant on predetermined system requirements including the availability of bandwidth.

2. A system according to claim 1 wherein the interface includes connection to other subscriber equipment via said radio communications provision and/or to external communications systems.

3. A system according to claim 2 wherein the external communications systems include the public switched telephone network.

4. A system according to claim 1 wherein the predetermined system requirements include radio communications provision capacity and/or subscriber equipment information.

5. A system according to claim 4 wherein the subscriber equipment information includes: periods of access to said second bandwidths; priority rating for access to said second bandwidths; subscription status; subscriber bandwidth access limitations.

6. A system according to claim 5 wherein said automatic controlling means includes a database of said subscriber equipment information.

7. A system according to claim 4 wherein the predetermined system requirements are monitored by a database means.

8. A system according to claim 1, wherein said system further includes billing means responsive to said system reconfiguration whereby to operate said billing means according to a different tariff for usage of said second bandwidths by said subscriber equipment.

9. A system according to claim 1, wherein the system comprises an analogue interface to the subscriber equipment.

10. A communication system serving a plurality of subscribers and comprising: an automatic controlling means including a database of subscriber information: a plurality of subscriber radio communication links capable of communicating over two or more bandwidths; an exchange facility;

wherein each subscriber may be connected to said exchange facility by a subscriber radio communications link over one of said bandwidths;

and wherein said automatic controlling means is adapted to reconfigure the system such that said subscriber connection is by said subscriber radio communications link over a second said bandwidth, said reconfiguration being dependent on subscriber bandwidth requirements or requests communicated to said controlling means, subscribe information, and system capability including the availability of bandwidth.

11. A communications system according to claim 10 wherein the exchange facility includes interfaces to external communications systems.

12. A communications system according to claim 10 wherein the subscriber information includes: subscription status; priority rating for access to said second bandwidths; subscriber bandwidth access limitations; periods of access to said second bandwidths.

13. A communications system according to claim 10 wherein said system further includes billing means responsive to said system reconfiguration whereby to operate said billing means according to a different tariff for usage of said second bandwidth by said subscriber equipment.

14. A method of operating a communications system serving a plurality of subscribers and comprising: automatic controlling means including a database of subscriber information; a plurality of subscriber radio communications links capable of communicating over two or more bandwidths; an exchange facility; wherein each said subscriber is connected to said exchange facility by one of said subscriber radio communications links over one of said bandwidths; the method comprising:

(a) receiving a request to change the bandwidth of a subscriber radio communications link, (b) determining the system configuration including the availability of bandwidth such that the request is denied if the system is incapable of being reconfigured to support the request of bandwidth change;

(c) determining from the subscriber information whether the subscriber using said subscriber communications link is permitted the requested bandwidth change;

(d) reconfiguring the system and the subscriber radio communication link to operate at the requested bandwidth if the system is reconfigurable as determined in step (b), and the subscriber is permitted to change as determined in step (c).

15. A method according to claim 14 wherein the exchange facility includes an interface to an external communications system.

16. A method according to claim 15 wherein the bandwidth change is requested by: the subscriber using said subscriber radio communications link; another subscriber; the automatic controller means; an external communications user.

17. A method according to claim 14 wherein the subscriber information includes: subscription status; priority rating for access to said second bandwidths; subscriber bandwidth access limitations; periods of access to said second bandwidths.

18. A method according to claim 14 wherein step (a) further comprises requesting bandwidth change for a predetermined time period, and step (b) and (c) further comprise determining the system capacity and subscriber permission to change the bandwidth for said predetermined time.

19. A method according to claim 14 wherein said system further includes billing means responsive to said system reconfiguration and said method further comprises the step of:

(e) the billing means implementing an predetermined tariff for use of said subscriber radio communications link at said requested bandwidth.

* * * * *